UNITED STATES PATENT OFFICE.

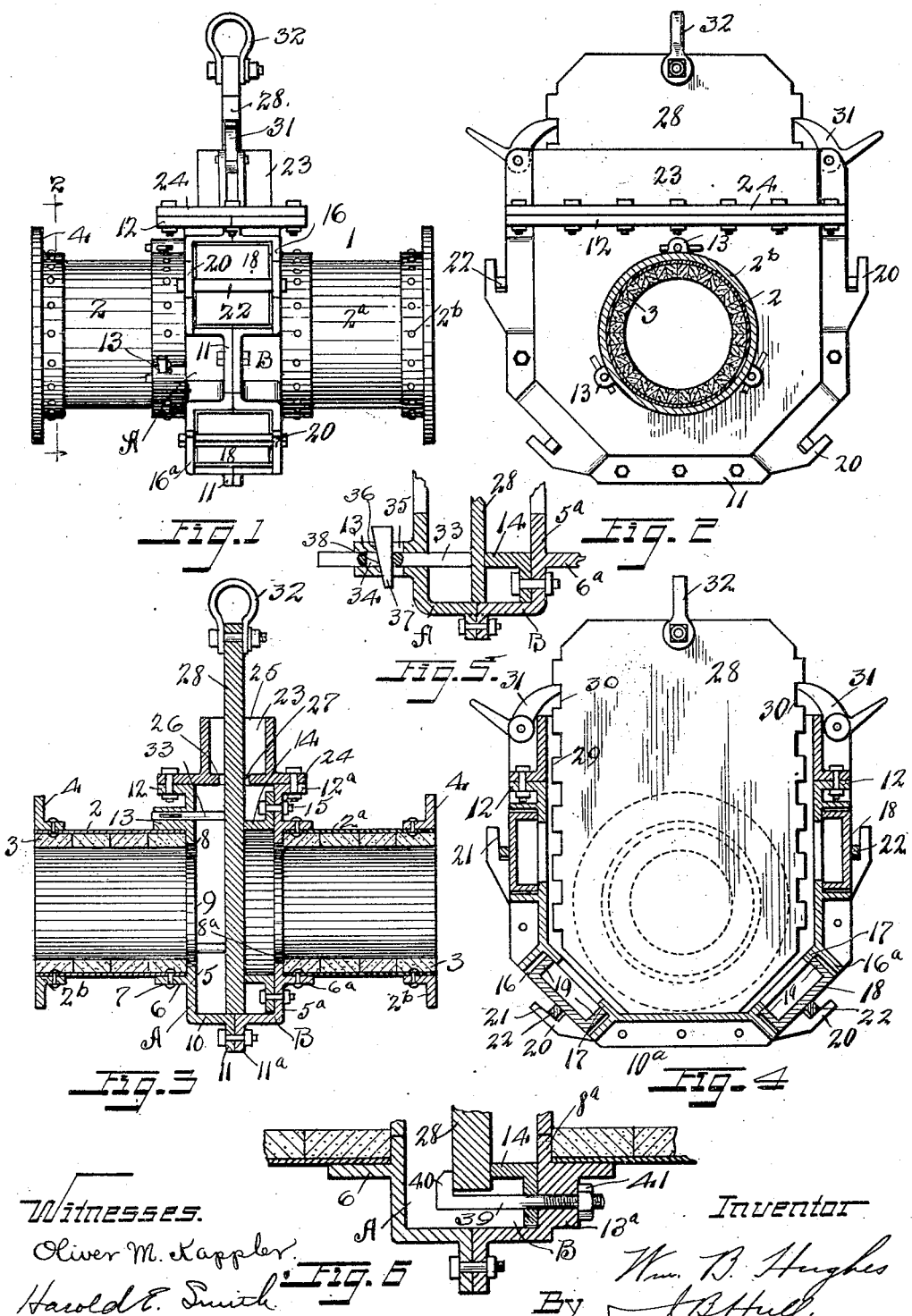

WILLIAM B. HUGHES, OF CLEVELAND, OHIO.

VALVE MECHANISM.

1,000,173.  Specification of Letters Patent.  Patented Aug. 8, 1911.

Application filed September 19, 1910. Serial No. 582,755.

*To all whom it may concern:*

Be it known that I, WILLIAM B. HUGHES, a citizen of the United States, residing at Cleveland, in the county of Cuyahoga and State of Ohio, have invented a certain new and useful Improvement in Valve Mechanism, of which the following is a full, clear, and exact description, reference being had to the accompanying drawings.

This invention relates to valve mechanism and finds its present chief utility in connection with mains or conduits which are employed for the purpose of conveying producer gas.

It is the object of the invention to produce a valve mechanism for such mains which, while simple in construction and economical of manufacture, is extremely efficient in use, permitting the employment of a freely sliding valve of the gate or disk type and at the same time securing a tight joint.

By the construction disclosed herein it is generally practicable to dispense with the use of sealing or luting material, which is ordinarily necessary with valves of the general type to which my invention relates. However, should it be necessary or desirable to use such material, the construction of valve mechanism disclosed herein enables the material to be readily applied to the valve and to be readily removed therefrom should occasion arise for opening the valve after having been sealed.

With the foregoing general objects in view, the invention may be defined further as consisting of the combinations of elements embodied in the claims hereto annexed and illustrated in the drawings forming part hereof, wherein—

Figure 1 represents a side elevation of a portion of a main or conduit having my valve mechanism applied thereto; Fig. 2 represents a sectional view corresponding to the line 2—2 of Fig. 1 and looking in the direction of the arrows; Fig. 3 represents a longitudinal sectional view through the main and valve mechanism shown in Fig. 1; Fig. 4 represents a sectional view taken through the valve chamber substantially parallel with and adjacent to the sliding gate or valve; Fig. 5 is an enlarged sectional detail of a portion of the valve mechanism showing the means for holding the valve to its seat, and Fig. 6 a similar view showing a modification of such holding means.

Describing the parts by reference characters, 1 denotes a section of a gas main or conduit which may be conveniently formed of a pair of wrought-metal casing sections 2, 2ª each having a suitable lining 3 of fire brick or other heat-resisting material. To the outer end of each section there is riveted a collar 2ᵇ having a flange 4 by means of which it may be connected to an adjacent conduit section. Each inner end of each conduit section 2 is provided with a valve-chamber section. The two sections are substantially symmetrical. One of these sections A comprises an apertured plate 5 provided with a collar 6, by means of which it may be secured, as through rivets 7, to the inner end of a conduit section 2. The plate 5 extends inwardly to form an annular abutment 8 for the lining 3, it being provided with an opening 9 registering with the bore of the conduit section 2. The plate 5 is of considerably greater lateral extent than the conduit section 2 and is provided with an extension 10 projecting inwardly or toward the opposite conduit section, said extension being provided at its inner end with a lateral flange 11.

In the drawings, the conduit sections 2, 2ª are shown as arranged horizontally and, for convenience of description, the words "top" and "bottom" will be applied to the correspondingly located parts as they appear on the drawings. At its upper edge, the chamber section A is flanged outwardly, as shown at 12. The collar 6 is provided with a suitable number of bosses 13 which are provided with apertures extending therethrough for the reception of the locking devices, to be described hereinafter. The opposite chamber section B is substantially identical with the section 5, the plate 5ª being provided with similar flanges 11ª and 12ª and a similar collar 6ª, the collar 6ª, however, not being provided with bosses 13. The plate 5ª is provided with an abutment 8ª and has secured thereto a collar 14 constituting an annular valve seat, the collar being shown as secured to the body of the chamber section by means of bolts 15.

The flanges 11 and 11ª do not extend in continuous contact around the bottom and sides of the valve chamber, but are shown as spaced apart at intervals and as given such shape as to provide suitable pockets or inclosures for doors, the doors affording access to the interior of the valve chamber for the purpose of applying suitable packing or luting material to the collar 14 (should it be necessary or desirable to do so) and for the purpose of removing such material if so applied. These inclosures or pockets are shown at 16. At the bottom, each pocket is provided with an inwardly projecting seat 17 which is adapted to receive and support a door. Each door is shown as consisting of a hollow or box-like metallic structure 18, the side flanges 19 of which are adapted to rest upon the seat 17, and, for the purpose of securing the doors in place, the inclosing flanges 16ª are shown as provided each with an ear or projection 20 which may be conveniently cast therewith. The inner faces 21 of these ears or projections are spaced from the adjacent edge of the flange proper and are beveled inwardly to form a tapering or wedge-shaped seat for a cross bar 22, the cross bars serving to retain the doors 18 securely in place.

It will be seen that the doors 18 are sufficiently smaller than the inclosures or pockets therefor to provide a space entirely around each door. This space is adapted to receive suitable packing material, as luting. Any suitable number of doors may be employed. In the drawings, four such doors are shown, two on each side.

It will be observed that the seats for the lower doors 18 extend upwardly and diagonally from the bottom 10ª of the valve chamber while the upper doors are located below the flanges 12. This construction locates the doors in such manner that access is provided to such parts of the valve chamber as will enable the convenient application of packing or luting material to the collar 14 and the removal of such material from the valve chamber when desired. While this construction is extremely convenient, whether the gas conduit extends horizontally or vertically, it is particularly convenient as to the diagonal door arrangement when the conduit extends horizontally.

On the flanges 12, 12ª there is mounted a casing 23, said casing being provided with flanges 24 by means of which it is secured to the flanges 12 and 12ª. The casing 23 is of general box-like construction, having an open top 25 and a bottom 26 provided with an elongated slot 27. This slot is for the reception of the sliding gate 28, said gate being shown as having its opposite side edges provided with projections 29 and notches 30, said projections and notches being adapted for the reception of pawls 31, whereby the gate may be secured in any adjusted position. A suitable shackle 32 is pivoted to the upper end of the gate, for convenience of manipulation. The body of the sliding gate 28 is adapted to seat against the inner end of the collar or valve seat 14. In order to hold the gate firmly against its seat, pins 33 are provided, said pins being slidably mounted within the bosses 13. For the purpose of securing these pins in place, and especially to force the gate to its seat, each pin may be conveniently provided with a slot 34 adapted to register with and envelop the corresponding slot 35 through the boss 13, one side of the slot 35 being beveled or inclined, as shown at 36. A sliding key 37 is provided for forcing each pin against the gate 28, each pin having a beveled surface 38 adapted to engage the beveled surface 36 for the aforesaid purpose.

In Fig. 6 there is shown a modification of the gate clamping means shown in the preceding figures. In this view, the chamber section B is provided with bosses 13ª having apertures therethrough for the reception of the bolts 39, each bolt having an angular projection or hook 40 adapted to engage the face of the gate 28 which is opposite the collar 14. The bolts 39 are adjusted by means of the nuts 41 applied thereto.

The construction described is comparatively simple and economical of production. The valve chamber, doors and casing 23 may be formed of castings, bolted together to form a complete chamber. Ordinarily, the employment of the pins or bolts 33 or 39 will be sufficient to prevent the leakage of gas between the collar 14 and the gate. Should some leakage exist, the accumulation of soot and tar, which are present to a greater or less extent in producer gas, tends to seal the joint between the valve and its seat. Should it be necessary or desirable to apply packing material or luting around the collar 14, the doors 18 afford a convenient means of access to such collar and the chamber for the purpose of applying the material thereto and, should it be necessary to open the valve, they afford an extremely convenient means for removing the packing from the casing. The casing 23 is also adapted to receive luting material entirely surrounding the sliding gate.

It will be noted that, in both modifications of gate-clamping devices, the means for forcing the gate to its seat are located externally of the conduit and valve chamber proper, particularly the devices for adjusting such means.

Having thus described my invention, what I claim is:

1. The combination, with a pair of conduit sections, of a valve chamber interposed between and connecting said sections, said chamber comprising a pair of sections connected respectively to the conduit sections, one of said sections being provided with a collar projecting into the body of the chamber, a sliding gate reciprocally mounted in said chamber, and means carried by and extending outside of one of the valve chamber sections and adapted to engage the gate to force the same against said seat.

2. The combination, with a pair of conduit sections, of a valve chamber interposed between and connecting said sections, an annular valve seat projecting into the interior of the chamber, a sliding gate in said chamber, a boss carried by the chamber, and a pin mounted in said boss and adapted to engage the gate to force the same to its seat.

3. The combination, with a pair of conduit sections, of a valve chamber interposed between and connecting said sections, an annular valve seat projecting into the interior of the chamber, a sliding gate in said chamber, bosses carried by the chamber, pins mounted in said bosses and adapted to engage the gate, and adjusting means engaging said pins and bosses to force the former against said gate.

4. The combination, with a pair of horizontally arranged conduit sections, of a valve chamber interposed between and connecting said sections, a casing mounted on said chamber and having a slot communicating therewith, a sliding gate vertically reciprocable in said chamber and said slot, a valve collar carried by one of the sections and projecting into said chamber, said chamber being provided with a space surrounding said collar and having ports communicating with said space, a pair of said ports being located adjacent to the bottom of the chamber, doors for closing said ports, and means for forcing the valve to a seat against said collar.

5. The combination, with a pair of conduit sections, of a valve chamber interposed between and connecting said sections, said chamber consisting of a pair of sections, said sections being provided with flanges whereby they may be secured together, a valve collar projecting into said chamber from one of the conduit sections, a sliding gate coöperating with said collar, the chamber being provided with pockets communicating with the interior thereof, projections on opposite sides of said pockets, doors removably applied to said pockets, and spaced from the side walls thereof, and means adapted to engage said projections to retain the doors in place.

6. The combination, with a pair of conduit sections, of a valve chamber interposed between and connecting said sections, said chamber consisting of a pair of sections, said sections being provided with means whereby they may be secured together, a valve collar projecting into said chamber from one of the conduit sections, a sliding gate coöperating with said collar, the chamber being provided with pockets having ports communicating with the interior of said chamber, projections on opposite sides of said pockets having inclined faces, doors removably applied to said pockets, and locking bars adapted to engage the inclined faces of said projections and retain the doors in place.

7. The combination, with a pair of conduit sections, of a valve chamber interposed between and connecting said sections, a sliding gate in said chamber, a seat for said gate, pins mounted in one of the walls of the chamber and adjustable at substantially right angles to the valve and adapted by their adjustment to force the valve against said seat, the outer portions of said pins projecting outside of the chamber, and means carried by said pins outside of the chamber and adapted to engage adjacent portions of the chamber to adjust the pins with reference to the valve.

8. The combination, with a pair of conduit sections, of a valve chamber interposed between and connecting said sections, a valve collar projecting into said chamber from one of the sections, a sliding gate coöperating with said collar, the chamber being provided with pockets communicating with the interior thereof, projections on the opposite sides of said pockets, doors removably applied to said pockets, and means adapted to engage said projections to retain the doors in place.

9. The combination, with a pair of conduit sections, of a valve chamber interposed between and connecting said sections, a valve collar projecting into said chamber from one of the sections, a sliding gate coöperating with said collar, the chamber being provided with pockets communicating with the interior of said chamber, projections on the opposite sides of said pockets having inclined faces, doors removably applied to said pockets, and locking bars adapted to engage the inclined projections of said faces and retain the doors in place.

10. The combination, with a pair of conduit sections, of a valve chamber interposed between and connecting said sections, a valve seat projecting inwardly into the chamber from one of said sections, a sliding gate reciprocably mounted in said chamber, a plurality of adjustable members extending through the wall of the valve chamber opposite said seat and adapted to engage the valve, and means located outside of the valve chamber for adjusting said members.

11. The combination, with a pair of conduit sections, of a valve chamber interposed between and connecting said sections, a sliding gate in said chamber, a seat for said gate, bosses carried by the chamber, pins mounted in said bosses and adapted to engage the gate, and adjusting means engaging said pins and bosses to force the pins against said gate.

In testimony whereof, I hereunto affix my signature in the presence of two witnesses.

WM. B. HUGHES.

Witnesses:
J. B. HULL,
BRENNAN B. WEST.

Copies of this patent may be obtained for five cents each, by addressing the "Commissioner of Patents, Washington, D. C."